Figure 1:
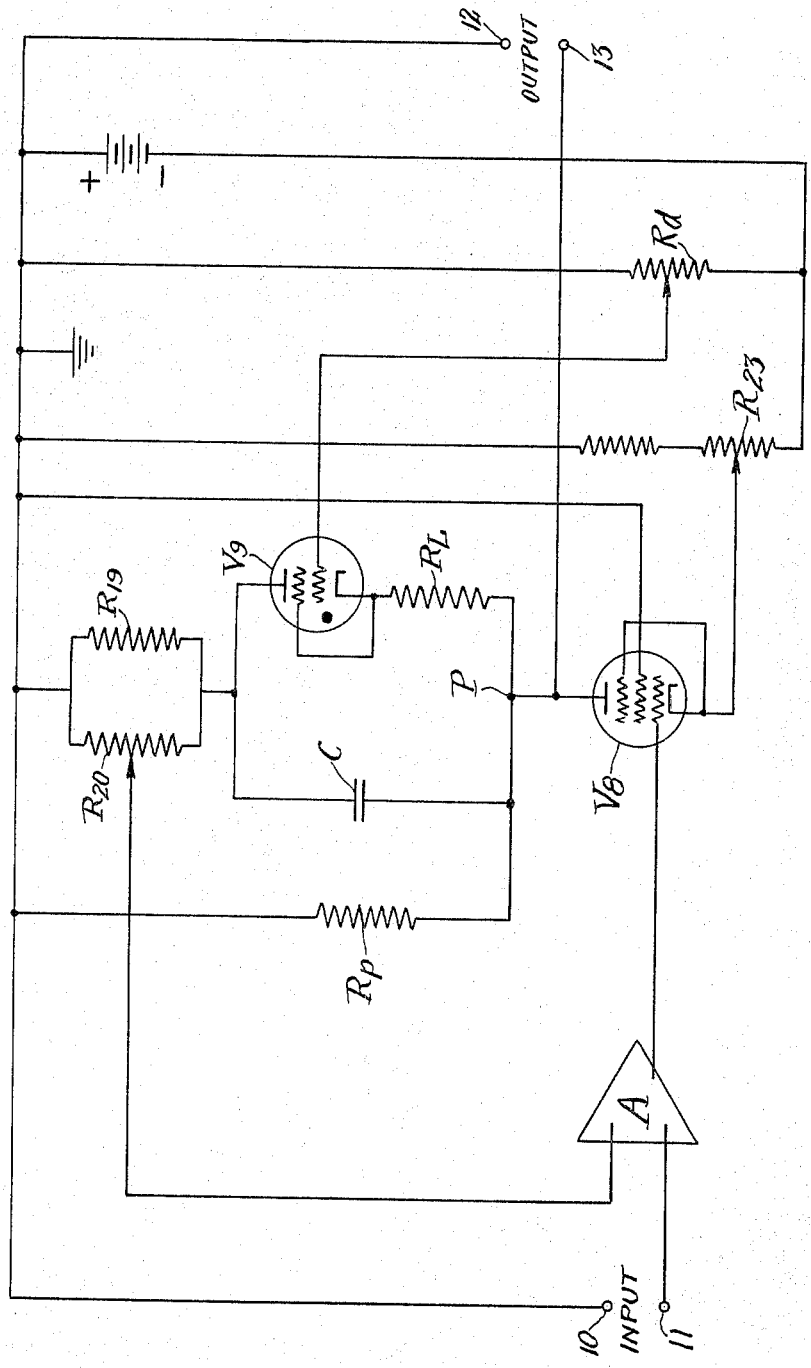

United States Patent Office 3,281,717
Patented Oct. 25, 1966

3,281,717
PULSE GENERATOR HAVING REPETITION RATE LINEARLY RESPONSIVE TO TRIGGER SIGNAL AMPLITUDE
William H. Wannamaker, Jr., Philadelphia, Pa., assignor to Royson Engineering Company, Hatboro, Pa., a corporation of Pennsylvania
Filed June 23, 1961, Ser. No. 119,150
5 Claims. (Cl. 331—131)

This invention relates to integrator circuits, i.e., circuits which, when supplied with a signal whose instantaneous value represents the instantaneous value of a variable, produce an output signal in the form of a series of pulses whose instantaneous repetition rate is linearly related to the instantaneous value of the variable.

The invention is particularly concerned with an integrator circuit in which a charging current whose value is linearly related to the value of the variable is employed to charge a capacitor, and in which circuit there is provided a discharge device arranged to discharge the capacitor when the voltage across the capacitor reaches a value equal to the firing voltage of the discharge device.

In an arrangement of this kind, the period of a complete output cycle is equal in length to the sum of the charging period and the discharging period. If the capacitor is supplied with a charging current which is linearly related to the signal to be integrated, and if the firing voltage of the discharge device is fixed, the relationship between the pulse repetition rate and the instantaneous value of the variable will depart from precise linearity for the reason set out just below.

Suppose that the time required for discharge of the capacitor through the discharge device is $t_d$. Suppose, also, that for a given value of the variable $x$ the charging time $t_x$ is equal to $10t_d$. The period of the output cycle, when the value of the variable is $x$, will therefore be $11t_d$. Now, if the value of the variable rises to $2x$, the charging time will be $5t_d$ and the period of the output pulse will be $6t_d$, which means that the pulse repetition rate is not precisely linearly related to the value of the variable. The error is attributable to the fact that, while the charging period is linearly related to the value of the variable, the pulse repetition rate is equal to the charging time plus the fixed discharge time.

One of the objects of the present invention is to eliminate the non-linearity just described.

The linearity of operation of circuits according to the invention also depends upon the degree of linearity which exists between the instantaneous value of the charging current and the instantaneous value of the variable. A further object of the invention is to insure a high degree of linearity between the amplitude of the charging current and the amplitude of the variable.

A further requirement, if the circuit is to achieve accuracy of operation, is that the discharge period terminate precisely; such precise termination is another object of the invention.

Yet another object of the invention is to insure that the pulse output of the circuit be zero when the value of the variable is zero, even for long periods of time.

Figure 2:
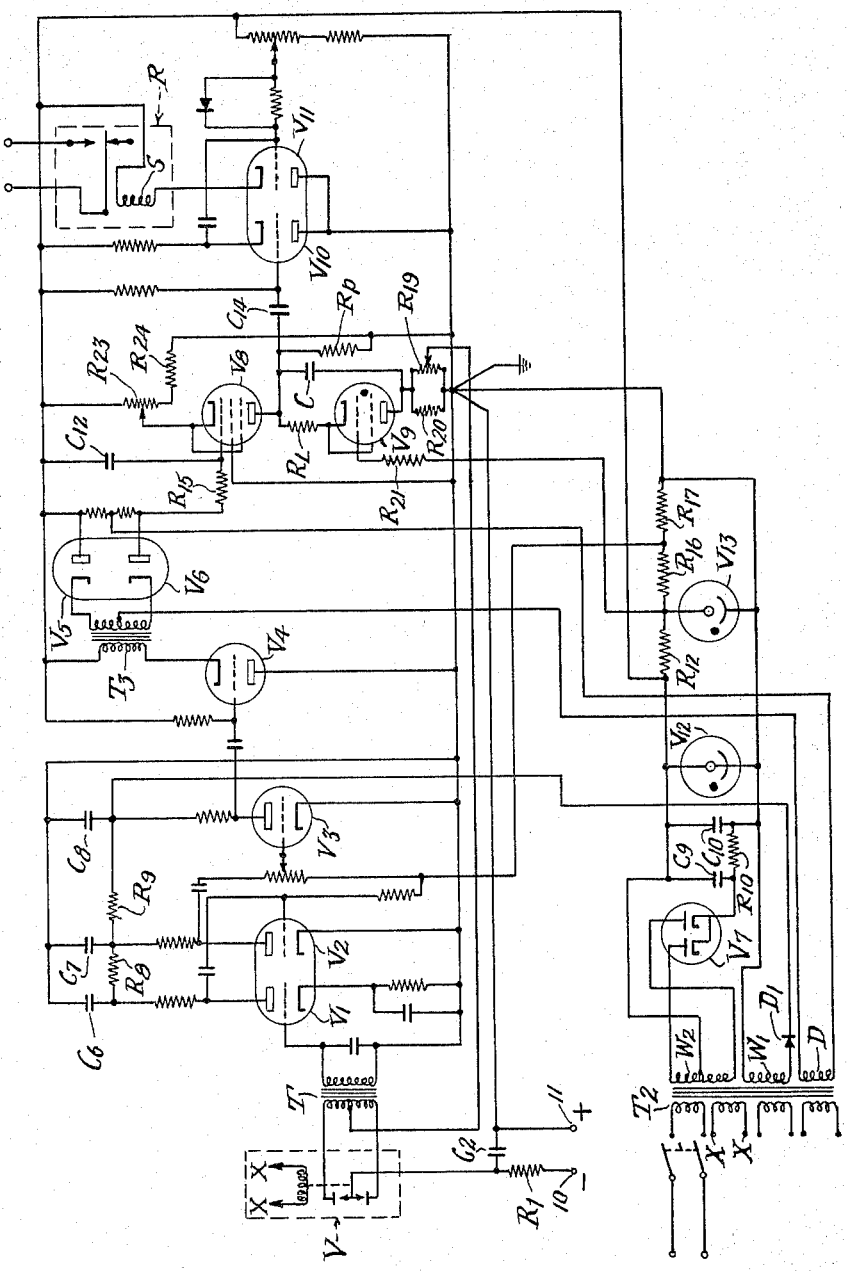

How the foregoing and other objects and advantages of the invention are achieved will be clear from the description which follows hereinbelow and from the two figures of the drawings, in which:

FIGURE 1 is a simplified diagram of important parts of the circuit of the invention; and FIGURE 2 is a complete schematic wiring diagram of an integrator constructed in accordance with the invention.

If a source of a small D.C. voltage $E_s$ to be integrated is connected to input terminals 10 and 11 of FIGURE 1, and if the instantaneous value of $E_s$ represents the instantaneous value of a variable, the circuit will operate as follows:

Assume, first, that $E_s=0$. Under these circumstances the output of amplifier A will be zero and pentode $V_8$ will be biased to cutoff. $V_8$, which is a voltage amplifier pentode, is employed as a current regulator. As is well known, the dynamic plate resistance of a pentode tube is very large, with the result that its plate current is inherently relatively constant for any given value of a control-grid potential. When $V_8$ is biased to cutoff, it still passes a very small current which flows through bypass resistor $R_p$. $R_p$ is a very high resistance, of the order of a megohm, and the cutoff current of the pentode is so low that the voltage drop across $R_p$ is negligible, and in any case, far below the firing potential of thyratron $V_9$. As a consequence, so long as $E_s$ is zero, a constant very small current flows through $R_p$ and a constant very small potential appears across $V_9$ and capacitor C. As a consequence, the cathode of $V_9$, which is connected to the point P through a very low resistance $R_L$ (of the order of 50 ohms), is at or very near to ground potential. On the other hand, the grid of $V_9$, by virtue of its connection to resistor $R_d$, is at a potential about 100 volts below that of the cathode of $V_9$, so that the thyratron firing voltage is very high.

If, now, $E_s$ increases to a finite value, a relatively positive voltage is applied to the grid of $V_8$, as a result of which the conductivity of $V_8$ increases and the absolute potential of the plate of $V_8$ falls. The voltage drop across $R_p$ becomes larger and current begins to flow into capacitor C; a voltage now also appears across $R_{19}$ and negative $R_{20}$, and feedback derived from $R_{20}$ is applied to the input of amplifier A. Thus, the feedback loop linearizes the charging current $I_c$ through $V_8$.

As the charge on capacitor C increases, the voltage applied across the plate and cathode of $V_9$ also increases; in addition, the absolute potential of the cathode of $V_9$ becomes more negative with respect to the grid of $V_9$, with the result that the firing voltage of $V_9$ decreases.

Assuming that the value of $E_s$ is constant, current flows into capacitor C at a constant rate until the voltage applied to the plate and cathode of $V_9$ reaches the firing voltage as determined by the grid-cathode potential applied to $V_9$. At this point, $V_9$ fires and the charge on capacitor C is dissipated in $R_L$, whose value is such as to limit the current through $V_9$ to the maximum peak value specified by the manufacturer of $V_9$.

During the discharge period the potential across capacitor C is decreasing, and the potential on the cathode of $V_9$ is going positive with respect to the grid. Thus, when the potential across the thyratron falls to the extinction potential, thryratron $V_9$ is cut off by a very large negative grid-to-cathode voltage.

Since the potential on capacitor C has risen slowly during the charging cycle and falls suddenly during the discharge cycle, a sawtooth pulse appears at output terminals 12 and 13.

The objects specifically recited above are obtained in the following manner: first, correction of the inherent non-linearity between the lengths of the output pulse cycle and charging current is achieved by virtue of the fixed bias applied to $V_9$. It will be noted that the conductivity of pentode $V_8$ is proportional to the instantaneous amplitude of $E_s$ and accordingly that the instantaneous potential of the cathode $V_9$ is also proportional to $E_s$. This means that the relative control grid bias on $V_9$ is decreased with increasing values of $E_s$, so that the firing voltage of $V_9$ is reduced and the firing time of $V_9$ is advanced. Furthermore, the advance of the firing time of $V_9$ also reduces the length of the charging period. This means that the entire output pulse cycle is relatively shortened as $E_s$ increases; the extent to which such shortening occurs depends upon the constants of the control grid bias circuit of $V_9$. These constants are determined empirically; I have found it convenient to linearize the circuit by adjusting the value of $R_{19}$ in the manner to be described below.

Linearization of the charging current with respect to the input signal is accomplished by two constant current feedback loops; the first of these is an overall negative feedback loop running from $R_{20}$ to the input of amplifier A. Since the entire charging current is proportional to the current which passes through $R_{20}$, feeding back a portion of the voltage appearing across $R_{20}$, in phase opposition to the input signal presented to amplifier A, tends to linearize the operation of amplifier A, pentode $V_8$, and their associated circuits.

A second current feedback loop is provided by the unbypassed portion of resistor $R_{23}$ in the cathode circuit of $V_8$.

Precision cutoff of thyratron $V_9$ is accomplished by the fixed bias arrangement described above.

Zero pulse output under zero input signal conditions is accounted for by the presence of $R_p$. If $R_p$ were removed from the circuit, the very small but finite cutoff current of pentode $V_8$ would, over a period of time, charge capacitor C to the firing point, resulting in an occasional output pulse.

A complete practical embodiment of the invention is illustrated in FIGURE 2. In addition to the elements disclosed in FIGURE 1 and already described, the circuit of FIGURE 2 includes a chopper, A.C. amplifier and discriminator, which together perform the function of amplifier A of FIGURE 1; a pulse shaping and output circuit; and power supply circuits for the chopper, amplifier, discriminator and output circuits, as well as for the portions of the circuit illustrated in FIGURE 1.

According to FIGURE 2, an A.C. signal whose amplitude is linearly related to the amplitude of the input signal is presented to the primary of transformer T by a vibrator generally indicated at V and which is energized from winding X—X of power transformer $T_2$.

The input signal is filtered by an R-C filter comprising resistor $R_1$ and capacitor $C_2$.

The voltage appearing at the secondary of transformer T is amplified in a cascade voltage amplifier of conventional construction comprising tubes $V_1$, $V_2$ and $V_3$.

The voltage appearing at the plate of $V_3$ is applied to the grid of a cathode follower amplifier $V_4$, which drives a discriminator comprising tubes $V_5$ and $V_6$ through transformer $T_3$. The discriminator circuit is also fed with an A.C. voltage derived from winding D of transformer $T_2$.

The discriminator output is filtered by an R-C filter comprising resistor $R_{15}$ and capacitor $C_{12}$ and applied to the control grid of pentode $V_8$ already described in connection with FIGURE 1.

The pulsating voltage appearing across capacitor C is delivered through a coupling capacitor $C_{14}$ to the grid of a cathode follower amplifier $V_{10}$, whose output drives a pulse shaper $V_{11}$, in whose cathode circuit is arranged the solenoid winding S of an output relay generally indicated at R.

Plate potentials for $V_1$, $V_2$ and $V_3$ are obtained from a power supply comprising winding $W_1$ of transformer $T_2$, rectifier $D_1$, filter capacitors $C_6$, $C_7$ and $C_8$ and resistors $R_8$ and $R_9$.

Plate potentials for cathode follower $V_4$, charging current for capacitor C, and plate potential for output tubes $V_{10}$ and $V_{11}$ are obtained from a power supply comprising winding $W_2$ of transformer $T_2$, full wave rectifier $V_7$, filter capacitors $C_9$ and $C_{10}$, resistor $R_{10}$ and voltage regulator tube $V_{12}$.

Fixed bias for thyratron $V_9$ is developed by a voltage divider comprising $R_{12}$, $R_{16}$ and $R_{17}$ across the power supply last mentioned, is stabilized by voltage regulator tube $V_{13}$, and is applied to the grid of $V_9$ through resistor $R_{21}$.

Initial adjustment of the circuit is accomplished as follows:

A fixed voltage whose amplitude is equal to the amplitude of a signal in the upper range of signals to be integrated is connected to input terminals 10 and 11. The position of the slider on feedback resistor $R_{19}$ (which in effect is a scale adjustment) is adjusted until the repetition rate of the pulses appearing at the output terminals is equal to the desired rate. The applied voltage is then reduced to a convenient mid-range value and the resistance of resistor $R_{20}$ is varied until the pulse repetition rate reaches a value appropriate to the integration of the mid-range input cycle.

It may be desirable to repeat the two operations just mentioned if the circuit was far from linear when adjustment was commenced.

After these adjustments have been completed, further adjustment of the value of $R_{20}$ is unnecessary even though $R_{19}$ may be adjusted from time to time to change the factor of proportionality between the pulse repetition rate and input signal amplitude.

The circuit of the invention is capable of precise integration of input signals whose amplitude is of the order of millivolts. Integration is accomplished linearly except in the bottommost fraction of 1% of the range of input signals where the result is distorted somewhat by the presence of bypass resistor $R_p$.

I claim:
1. An integrator circuit for producing an output signal in the form of a series of pulses whose instantaneous repetition rate is linearly related to the instantaneous value of a variable signal to be integrated, comprising: a storage capacitor; a controllable source of current including input means and output means, said output means being connected to one side of said capacitor; amplifier means; means for applying said variable signal to the input of said amplifier for amplification of the signal to be integrated, the output of said amplifier means being connected to said input means; said controllable source of current being responsive to signals from said amplifier means to supply current to said storage capacitor at a rate which is proportional to the instantaneous value of the signal to be integrated, the magnitude of the voltage across said storage capacitor being proportional to the capacitor charge; a discharge device having a pair of terminals connected across said storage capacitor, said discharge device including a control element and a voltage source connected thereto for maintaining a fixed bias on said control element with respect to ground, said fixed bias establishing the magnitude of the potential difference across said pair of terminals at which said discharge device begins to conduct; negative current feedback means connected between said storage capacitor and said amplifier means to maintain a linear relationship between the instantaneous values of said signal to be integrated and said repetition rate; and output terminal means connected to said storage capacitor means for carrying said output signal.

2. An integrator circuit according to claim 1, wherein said feedback means includes potentiometer means connected in series with said storage capacitor, said feedback signal passing through the variable tap on said potentiometer.

3. An integrator circuit according to claim 1, further including a by-pass resistance connected across said storage capacitor, said by-pass resistance having a value such that current supplied by said controllable source of current when the value of the signal to be integrated is zero produces a voltage across said by-pass resistance which is substantially less than the magnitude of the potential difference required to cause said discharge device to begin conducting.

4. A circuit for producing an output signal in the form of a series of pulses whose instantaneous repetition rate is directly proportional to the instantaneous value of a variable control signal, comprising: a controllable source of charging current including input means and output means; a charge circuit including a storage capacitor connected to the output means of said source of current; circuit means for applying said control signal to the input means of said source of current; a feedback loop including means for sensing said charging current to supply to said circuit means a negative feedback signal linearly related to said charging current; said source of current being responsive to said control and feedback signals to deliver to said storage capacitor a charging current whose instantaneous value is proportional to said control signal; a normally nonconductive discharge circuit including an electron discharge device connected across said storage capacitor and a biasing circuit for said discharge device, said biasing circuit including a fixed voltage source for establishing the magnitude of the potential difference across said storage capacitor at which said discharge circuit becomes conductive; and output terminal means connected to said discharge circuit for carrying said output signal, whereby said storage capacitor will be charged by said source of current in response to said variable control signal and will be periodically discharged by said discharge circuit to produce said output signal.

5. The circuit of claim 4, further including a by-pass resistor connected across said storage capacitor, said by-pass resistor having a value such that the charging current produced by said source of current when the value of the control signal is zero produces a voltage across said by-pass resistor which is substantially less than the magnitude of the potential difference required to cause said discharge circuit to become conductive.

References Cited by the Examiner
UNITED STATES PATENTS

| | | | |
|---|---|---|---|
| 2,083,202 | 6/1937 | Schlesinger | 315—241 X |
| 2,088,495 | 7/1937 | Swedlund | 315—241 X |
| 2,102,951 | 12/1937 | Hackenberg | 315—241 X |
| 2,129,036 | 9/1938 | Schlesinger | 315—241 X |
| 2,662,981 | 12/1953 | Segerstrom | 328—67 |

OTHER REFERENCES

Blair, An Improved Current Integrator, Review of Scientific Instruments, vol. 14, No. 3, March 1943, pages 64 to 67.

DAVID J. GALVIN, *Primary Examiner.*

RALPH G. NILSON, GEORGE N. WESTBY,
*Examiners.*

C. R. CAMPBELL, D. E. SRAGOW,
*Assistant Examiners.*

UNITED STATES PATENT OFFICE
CERTIFICATE OF CORRECTION

Patent No. 3,281,717

October 25, 1966

William H. Wannamaker, Jr.

It is hereby certified that error appears in the above numbered patent requiring correction and that the said Letters Patent should read as corrected below.

Column 2, line 33, strike out "negative" and insert the same after "and" in line 34, same column 2.

Signed and sealed this 5th day of September 1967.

(SEAL)
Attest:

ERNEST W. SWIDER
Attesting Officer

EDWARD J. BRENNER
Commissioner of Patents